United States Patent
Weigert

(10) Patent No.: US 7,602,739 B2
(45) Date of Patent: Oct. 13, 2009

(54) COMMUNICATION ARRANGEMENT AND METHOD FOR BIDIRECTIONALLY TRANSMITTING DATA BETWEEN A FIRST COMMUNICATION UNIT AND A SECOND COMMUNICATION UNIT

(75) Inventor: Martin Weigert, Hardt (DE)

(73) Assignee: Avago Technologies Fiber IP (Singapore) Pte. Ltd., Singapore (SG)

(*) Notice: Subject to any disclaimer, the term of this patent is extended or adjusted under 35 U.S.C. 154(b) by 468 days.

(21) Appl. No.: 11/347,620

(22) Filed: Feb. 3, 2006

(65) Prior Publication Data

US 2006/0200585 A1    Sep. 7, 2006

(30) Foreign Application Priority Data

Feb. 4, 2005 (DE) .................. 10 2005 006 016

(51) Int. Cl.
*H04L 5/14* (2006.01)
(52) U.S. Cl. ...................... 370/276; 370/464
(58) Field of Classification Search ................ 370/252, 370/276–284, 225, 227, 218, 464, 480, 485, 370/486, 487; 307/9.1, 10.1; 398/43, 66, 398/68, 70, 71, 72; 379/350, 377, 379; 385/53, 385/55, 56, 58, 59
See application file for complete search history.

(56) References Cited

U.S. PATENT DOCUMENTS

| | | | | |
|---|---|---|---|---|
| 5,604,509 A | * | 2/1997 | Moore et al. | 345/2.1 |
| 5,724,475 A | * | 3/1998 | Kirsten | 386/109 |
| 5,778,002 A | | 7/1998 | Werle | |
| 6,025,654 A | * | 2/2000 | Roppel et al. | 307/10.1 |
| 6,148,423 A | * | 11/2000 | Le Mouel et al. | 714/708 |
| 6,167,061 A | * | 12/2000 | Nakatsugawa | 370/480 |
| 7,424,225 B1 | * | 9/2008 | Elliott | 398/115 |
| 2003/0063350 A1 | * | 4/2003 | Chiou et al. | 359/172 |

FOREIGN PATENT DOCUMENTS

| | | |
|---|---|---|
| AT | 408 822 B | 3/2002 |
| DE | 41 01 962 A1 | 7/1992 |
| DE | 199 33 067 C2 | 2/2001 |
| DE | 199 44 967 A1 | 5/2001 |
| WO | WO 02/43991 A1 | 6/2002 |

OTHER PUBLICATIONS

Avionic Systems Standardisation Committee, High Speed Interfaces Working Group, "Guide to Avionics Data Buses", Issue 6, Apr. 1995, 41 pgs.

* cited by examiner

*Primary Examiner*—Kwang B Yao
*Assistant Examiner*—Obaidul Huq

(57) ABSTRACT

A communication arrangement and a method are provided for bidirectionally transmitting data between a first communication unit and a second communication unit. The first communication unit and the second communication unit are connected to one another via a fiber-optic link. In addition, the first communication unit and the second communication unit have a nonoptical link between them. Data in one transmission direction is transmitted via the fiber-optic link and data in the other transmission direction is transmitted via the nonoptical link.

13 Claims, 3 Drawing Sheets

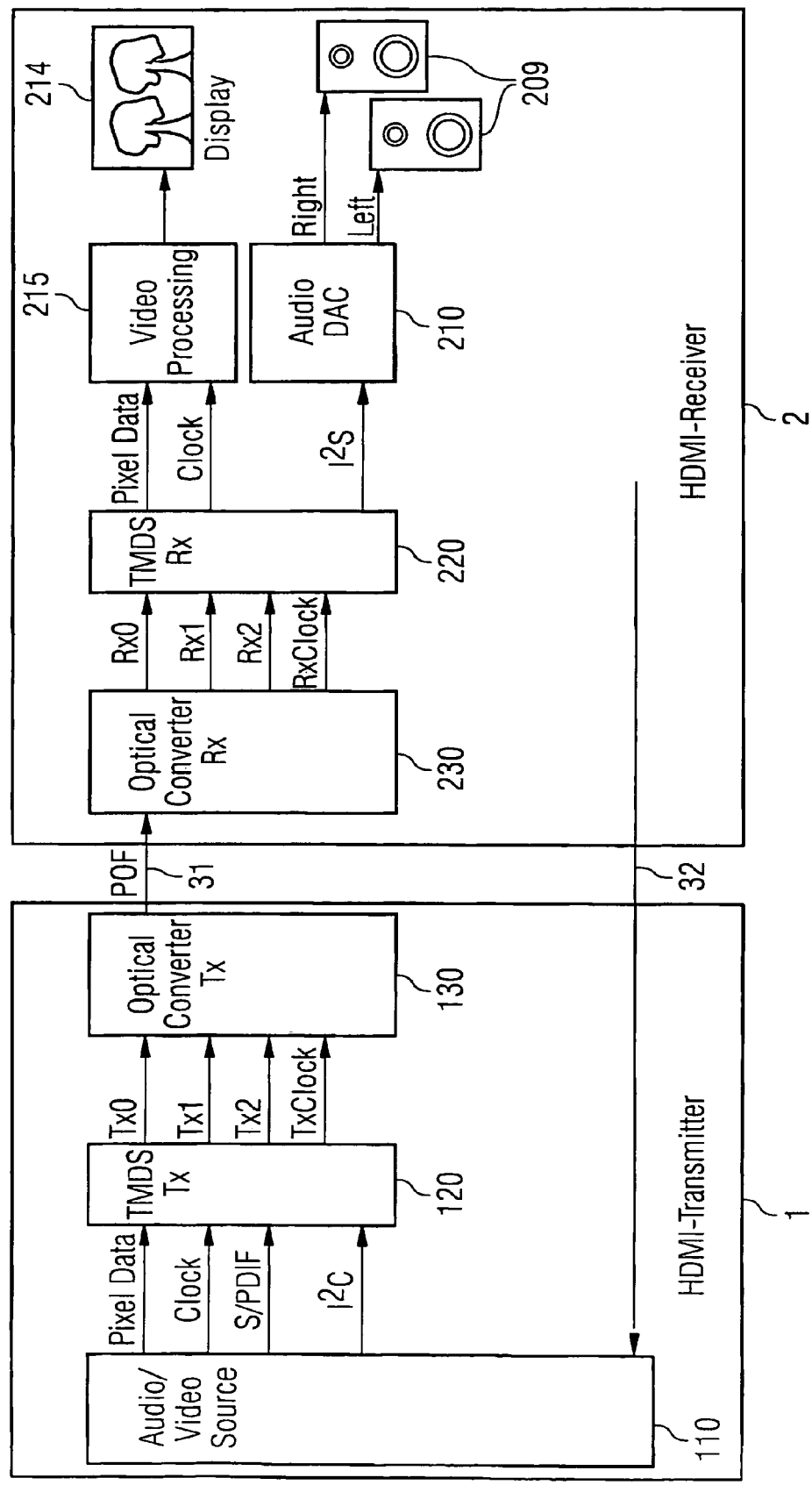

COMMUNICATION ARRANGEMENT AND METHOD FOR BIDIRECTIONALLY TRANSMITTING DATA BETWEEN A FIRST COMMUNICATION UNIT AND A SECOND COMMUNICATION UNIT

REFERENCE TO RELATED APPLICATIONS

This application claims the benefit of the priority date of German application DE 10 2005 006 016.1, filed on Feb. 4, 2005, the contents of which are herein incorporated by reference in their entirety.

FIELD OF THE INVENTION

The invention relates to a communication arrangement for bidirectionally transmitting data between a first communication unit and a second communication unit, and to a corresponding method.

BACKGROUND OF THE INVENTION

It is known practice to transmit data between two communication units asymmetrically, i.e. to produce different data rates in the two transmission directions. This is particularly appropriate when the data rates or bandwidths in the two transmission directions differ greatly.

To produce asymmetrical links, it is known practice to connect two communication units via a fiber-optic link, for example. The fiber-optic link has either two fibers (one for each respective transmission direction) or one fiber, in which case data are transmitted in half-duplex mode or—if different wavelengths are used—simultaneously.

In this context, it is usual to use the same technology for both transmission directions. However, this is inefficient in as much as an asymmetrical data transmission requires a high bandwidth only for one transmission direction. By way of example, a link between a camera, a control unit and a screen requires a high bandwidth in the Gbit/s range only for transmitting data from the camera to the screen. By contrast, the control signals for the camera which are transmitted in the opposite direction by the control unit generally require only a low bandwidth in the Kbit/s range.

The existing systems for asymmetrical data transmission are thus distinguished by incomplete utilization of the data channel with the low data rates, which results in this data channel being relatively cost-intensive in terms of the transmitted data rate.

In addition, "media converters" are known which extend the range of existing copper links by interposing an optical transmission link in an electrical transmission link. In this case too, data transmission is effected in both transmission directions using the same technology.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The present invention is directed to asymmetrical data transmission and particularly to a telecommunication arrangement and a method which produces the narrowband transmission channel inexpensively.

Accordingly, the inventive solution comprises data transmission in one transmission direction via a fiber-optic link, while the data transmission in the other transmission direction is implemented in another way. In particular, according to the invention an asymmetrical data transmission involves the wideband transmission channel being produced by the fiber-optic link, while the narrowband channel is produced by the nonoptical link.

It will be pointed out that the term "link" in the terms "fiber-optic link" and "nonoptical link" denotes a physical link between the communication units, i.e. a data transmission section or a sequence of data transmission sections via which the data can be transmitted. An actual data transmission takes place only when data are being transmitted for an application running on the communication units.

It will also be pointed out that the term "fiber-optic link" does not rule out a subsection of the link in question being provided in nonoptical form between the communication units. It is merely necessary for at least one subsection to be provided in fiber-optic form. In one example, the fiber-optic link is produced in fiber-optic form on all the subsections between the communication units, however.

In this context, the fiber-optic link is used for transmitting useful data (e.g., audio or video data, data from a www application or data from an ftp application), while the nonoptical link is used for transmitting control signals and/or signaling data. Control signals are, for example, signals or data which are used for controlling a device, for example, which transmit a code or which acknowledge the receipt of data. Signaling data are, for example, data which are used for setting up and clearing down a connection in a communication operation between the communication units in question.

The fiber-optic link is, in one example, a glass fiber link or a plastic fiber link. The nonoptical link for the low data rate is produced, for example, by a copper-based line or by a wireless radio link, for example based on the standards Bluetooth, WLAN or IrDa.

In one embodiment of the invention, the inventive arrangement is integrated in a motor vehicle, with the first communication unit being an electrical central unit in the motor vehicle and the second communication unit being a data capture unit (e.g., a camera) which transmits captured data to the central unit using a wide bandwidth. In this case, the nonoptical link is provided by means of a bus system in the motor vehicle.

In another embodiment of the invention, the first communication unit is an audio and/or video playback unit and the second communication unit is a data storage unit for storing audio and/or video data which transmits stored data to the playback unit using a wide bandwidth. In this example, the nonoptical communication channel is provided by means-of a copper link or a wireless radio link.

The bidirectional data transmission between the communication units takes place, for example, for an application implemented on level 7 of the OSI reference model, in particular. Level 7 of the OSI reference model relates to what is known as the application layer. The data transmission thus takes place such that the data transmitted in the two transmission directions are based on one another, that is to say that both are used to produce the same communication operation or the same application between the communication units.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention is explained in more detail below using a plurality of exemplary embodiments with reference to the figures of the drawings, in which:

FIG. 4 is a block schematic diagram illustrating a communication arrangement for transmitting audio/video data between a transmission unit and a reception unit on the basis of the communication standard HDMI, the transmission unit and the reception unit being connected to one another firstly via a fiber-optic link and secondly via a nonoptical link according to another embodiment of the invention.

DETAILED DESCRIPTION OF THE INVENTION

Figure 1:
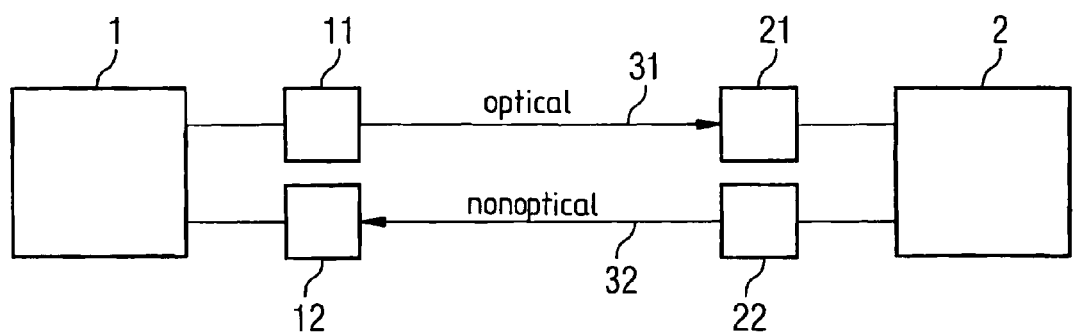
FIG. 1 is a block schematic diagram illustrating a basic design of a telecommunication arrangement with a fiber-optic link and a nonoptical link.

FIG. 1 schematically shows the basic design of a telecommunication arrangement for asymmetrically transmitting data according to one embodiment of the invention. A first communication unit 1 and a second communication unit 2 are provided, between which data can be transmitted bidirectionally. The communication unit 1 has an associated optical interface 11 and an associated nonoptical interface 12. The communication unit 2 likewise has an associated optical interface 21 and an associated nonoptical interface 22. One optical interface 11 is an electro-optical transducer, for example, which converts electrical data into optical data using an LED or a laser diode. The other optical interface 21 is an opto-electronic transducer, for example, which converts an optical datastream into an electrical datastream using a photodiode, for example. In this case, the interfaces 11, 21 may each have further inherently known components, such as laser drivers, preamplifiers, postamplifiers, serializers and deserializers.

The nonoptical interfaces 12, 22 are connected to one another by a nonoptical link 32, which is a copper cable or a radio link, for example. The nonoptical interfaces 12, 22 condition the data for data transmission via the nonoptical link 32.

Wideband data transmission from the communication unit 1 to the communication unit 2 is effected, in one example, exclusively via the optical link 11, 31, 21. By contrast, data transmission from the communication unit 2 to the communication unit 1 is effected exclusively via the nonoptical link 22, 32, 12. While the wideband transmission link 31 is used primarily for transmitting large volumes of data, the narrowband transmission link 32 is used primarily for transmitting control and/or signaling information, such as appliance control characters for turning appliances on and off and signaling information for associating the respective transmitted and received data with the same communication operation and/or for connection setup and cleardown.

In one embodiment of the invention the communication arrangement in FIG. 1 is used for bidirectional, asymmetrical transmission of data from a particular application. In one example, the data transmitted using a narrow bandwidth are acknowledgement packets, for example, acknowledging the receipt of data packets transmitted via the wideband channel 31. In principle, the communication arrangement can also be used for different applications, however, with each channel 31, 32 transmitting data from different applications; in other words the respectively transmitted data are not used for implementing the same communication operation. By way of example, the wideband channel 31 transmits video streaming data, while the narrowband channel 32 transmits appliance control characters for adjusting a camera.

Figure 2:
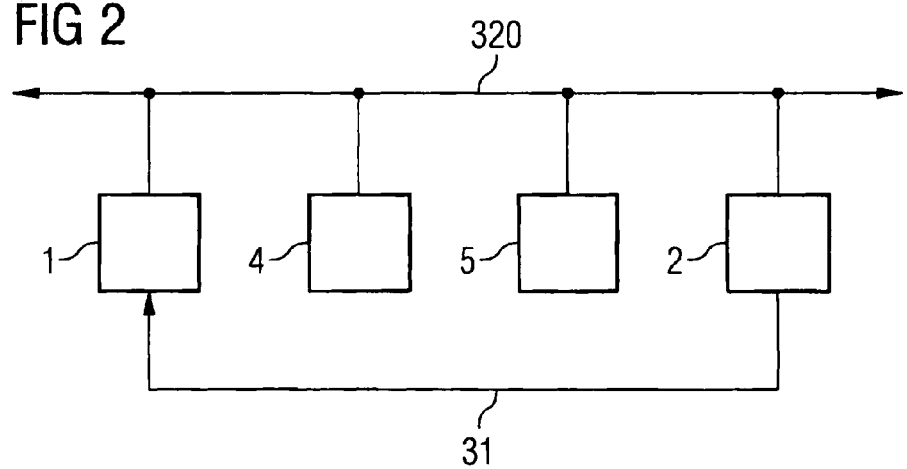
FIG. 2 is a block schematic diagram illustrating a telecommunication arrangement in which two communication appliances are connected to one another firstly by a serial bus and secondly by a fiber-optic link.

FIG. 2 shows an example embodiment in which a plurality of communication appliances 1, 2, 4, 5 are connected to a serial bus 320. By way of example, it is a CAN bus, which is usually used in motor vehicles. The communication unit 1 is a central unit in the motor vehicle, for example. The communication unit 2 is a camera, for example. The central unit 1 and the camera 2 are connected to one another via the serial bus 320 and additionally via a wideband fiber-optic link 31. In this example the wideband fiber-optic link 31 is used to transmit video data from the camera 2, e.g., using real-time transmission without compression, to the central unit 1. The optical line is in the form of a plastic fiber or in the form of a glass fiber cable. At the same time, the camera 2 is connected to the serial bus 320 via a copper line. The serial bus 320 is used to transmit data from the central unit 1 to the camera 2 using a narrow bandwidth, for example control signals for turning the camera 2 on or off, for moving the camera, etc.

The technology for the high data rate can be implemented relatively inexpensively. In particular, inexpensive plastic fibers with large core diameters of greater than 100 μm can be used. The transmission source used for the optical line is a fast LED or a vertically emitting laser (VCSEL), for example. The receiver used is an Si or GaAs photodiode, for example. However, the fiber link is more cost-intensive than an unshielded copper link designed for low data rates. By providing the narrowband return channel via the CAN bus 320, it is possible to save considerable costs, even in as much as no optoelectronic transducers are required for the narrowband link and are saved.

Figure 3:
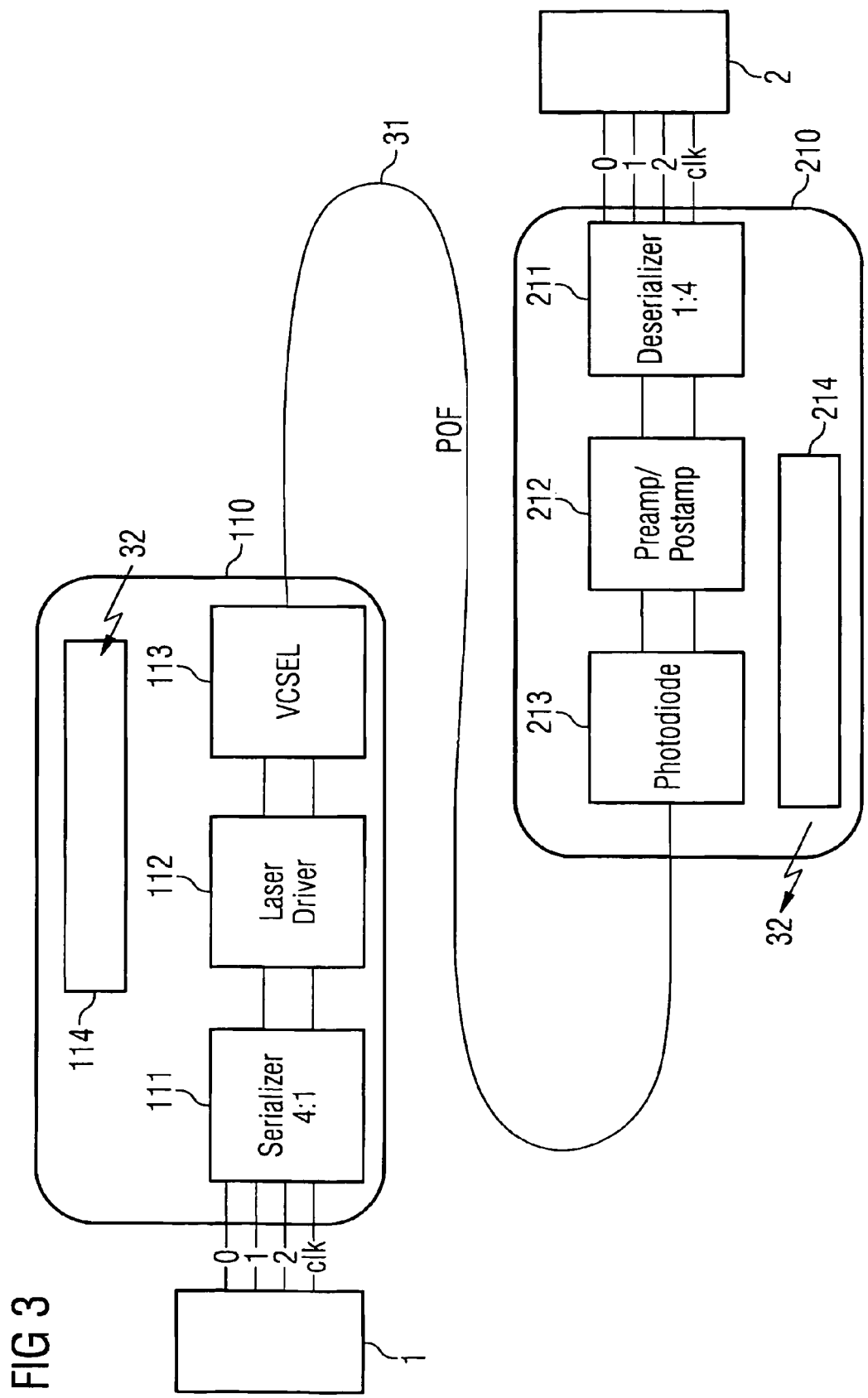
FIG. 3 is a block schematic diagram illustrating an exemplary embodiment of a telecommunication arrangement in which the data transmission in one transmission direction is produced in fiber-optic form using an optical converter and an optical deconverter and the data transmission in the other transmission direction is produced by means of a wireless radio link.

FIG. 3 shows another example embodiment of a telecommunication arrangement in which a data source 1 and a data sink 2 are connected to one another via an optical link 31. In this arrangement, the data source 1 has an associated optical converter 110 and the data sink 2 has an associated optical deconverter 210. The optical converter 110 has a serializer 111, a laser driver 112, at least one laser diode 113 and also a wireless radio interface 114. The optical deconverter associated with the data sink 2 has a photodiode 213, an amplification unit 212 and a deserializer 211 and also likewise an optical radio interface 214. The data source 1 transmits, for example, data via four parallel lines, three of which are data lines and one of which is a clock line, to the optical converter 110, which transmits them as an optical signal to the optical deconverter 210. The latter converts the signal into an electrical signal which is then transmitted on four lines, three of which are again data lines and one of which is a clock line, to the data sink 2. The return channel is provided by a radio link using the radio interfaces 214, 114.

The example embodiment described relates to a data transmission between a DVD player and the associated monitor, for example, or to the data transmission between a CD player and a computer, between a camera and a monitor, between a computer and a projector, etc., for example. The return channel is provided either using a simple copper link (an unshielded copper line) or by means of a wireless radio link based on current standards.

FIG. 4 shows another example embodiment in which video and audio data are transmitted from a transmitter 1 to a receiver 2. The transmitter 1 is an HDMI transmitter and the receiver 2 is an HDMI receiver, i.e. the transmitter 1 and the receiver 2 are in a form such that they are based on the HDMI standard. HDMI stands for "High Definition Multimedia Interface" and is an industrial standard. Alternatively, the transmitter 1 and the receiver 2 may also be produced on the basis of other standards, for example, on the basis of the DVI (Digital Visual Interface) standard. Said standards HDMI and DVI allow wideband data transmission in the home entertainment sector, particularly for transmitting digital video data and digital audio data. Particular connectors and interfaces are defined in this case.

The transmitter 1 has an audio/video data source 110, a TMDS transmission chip 120 and an optical transmission converter 130. The receiver 2 has an optical receiver converter 230, a TMDS receiver chip 220, a chip 215 for processing the video data, a chip 210 for processing the audio data, a display 214 for displaying the video data and loudspeakers 209 for reproducing the audio data. In one example, the TMDS transmission chip 120 is a SiI9190 chip with HDCP and the TMDS receiver chip 220 is a SiI9993 chip with HDCP, each from the company Silicon Image, Sunnyvale, Calif., USA. The optical transmission converter 130 has at least one VCSEL and the optical reception converter 230 has at least one photodiode. A fiber-optic link 31 is provided between the transmitter 1 and the receiver 2 by means of a plastic fiber. At the same time, a narrowband return channel 32 is provided by means of a radio interface or a copper cable. The narrowband channel 32 is used to transmit control signals, for example, to the transmitter 1 regarding what video and/or audio files need to be transmitted to the receiver 2.

In accordance with FIG. 4, the optical transmission converter 130 comprises, in one example, a serializer which converts the data from a plurality of incoming data channels Tx0, Tx1, Tx2 into a serial datastream, which is then transmitted as an optical signal via the fiber-optic link 31. Correspondingly, the optical receiver converter 230 has, in one example, a deserializer which outputs data on three output channels Rx0, Rx1, Rx2. The data are then processed further in a manner which is known per se.

The refinement of the invention is not limited to the exemplary embodiments described above. By way of example, a data transmission may be produced for other standards and in other network arrangements or bus systems. It will also be pointed out that there is nothing to stop the first and second communication units from receiving or forwarding the received or transmitted data from or to other communication units.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A communication arrangement in a motor vehicle for bidirectionally transmitting data in the motor vehicle, the communication arrangement comprising:
   a first communication unit, the first communication unit comprising at least a data source configured to transmit data from the date source to one or more devices in the motor vehicle other than the data source, the data comprising at least video data;
   a second communication unit, the second communication unit comprising at least a data sink, the data sink being configured to receive data transmitted by the data source and to generate one or both of control and signaling data for controlling operations of the data source of the first communication unit
   a fiber-optic link coupled between the first communication unit and the second communication unit, the fiber-optic link having a high bandwidth capacity, and wherein the data transmitted from the data source of the first communication unit to the data sink of the second communication unit is transmitted over the fiber-optic link using the high bandwidth capacity of the fiber-optic link; and
   a nonoptical link coupled between the first communication unit and the second communication unit, the nonoptical link having a lower bandwidth capacity than the bandwidth capacity of the fiber-optic link, and wherein said one or both of control and signaling data generated by the data sink of the second communication unit is transmitted over the nonoptical link from the data sink to the data source using the lower bandwidth capacity of the nonoptical link.

2. The arrangement of claim 1, wherein the nonoptical link comprises a wireless radio link.

3. The arrangement of claim 1, wherein the nonoptical link comprises a copper cable link.

4. The arrangement of claim 1, wherein the nonoptical link comprises an electrical data bus.

5. The arrangement of claim 1, wherein the fiber-optic link comprises a glass fiber or a plastic fiber.

6. The arrangement of claim 1, wherein the data sink of the second communication unit comprises an electrical central unit, and wherein the data source of the first communication unit comprises a data capture unit that captures data and transmits the captured data to the electrical central unit over the fiber-optic link using the high bandwidth capacity of the fiber-optic link, and wherein the nonoptical link comprises a bus system in the motor vehicle, the electrical central unit generating said one or both of control and signaling data and transmitting said one or both of control and signaling data over the nonoptical link to the data capture unit of the first communication unit using the lower bandwidth capacity of the nonoptical link.

7. The arrangement of claim 6, wherein the data capture unit comprises a camera.

8. The arrangement of claim 1, wherein the data source of the first communication unit comprises a data storage unit and wherein the data sink of the second communication unit comprises an audio or video playback unit, the data storage unit being configured to store video data or audio and video data, and wherein the data storage unit transmits stored data to the playback unit over the fiber-optic link, and wherein the nonoptical communication link comprises a copper link or a wireless radio link, and wherein the playback unit generates and transmits said one or both of control and signaling data over the nonoptical communication link to the data storage unit.

9. A method for bidirectionally transmitting data between a first communication unit and a second communication unit in a motor vehicle, the method comprising:
   providing a first communication unit comprising at least a data source configured to transmit data from the data source to one or more devices in the motor vehicle other than the data source, the data comprising at least video data;
   providing a second communication unit, the second communication unit comprising at least a data sink, the data sink being configured to receive data transmitted by the data source and to generate one or both of control and signaling data for controlling operations of the data source of the first communication unit;
   providing a fiber-optic link coupled between the first communication unit and the second communication unit, the fiber-optic link having a high bandwidth capacity;
   providing a nonoptical link coupled between the first communication unit and the second communication unit, the nonoptical link having a lower bandwidth capacity than the bandwidth capacity of the fiber-optic link;
   transmitting the data comprising at least video data in a first transmission direction via the fiber-optic link from the data source of the first communication unit to the data sink of the second communication unit using the high bandwidth capacity of the fiber-optic link; and
   transmitting said one or both of control and signaling data generated by the data sink of the second communication unit over the nonoptical link from the data sink of the second communication unit to the data source of the first communication unit using the lower bandwidth capacity of the nonoptical link.

10. The method of claim 9, wherein the data source of the first communication unit comprises a data capture unit and wherein the data sink of the second communication unit comprises an electrical central unit of the motor vehicle, and wherein the data capture unit transmits captured data to the electrical central unit via the fiber-optic link, and wherein the electrical central unit transmits said one or both of control and signaling data to the data capture unit via the nonoptical link, the nonoptical link comprising a bus system in the motor vehicle.

11. The method of claim 9, wherein the data source of the first communication unit comprises a data storage unit and wherein the data sink of the second communication unit comprises a playback unit that plays back one or both of audio and video data, the data storage unit being configured to store video data or audio and video data, and wherein the data storage unit transmits stored data to the playback unit over the fiber-optic link, and wherein the playback unit generates and transmits said one or both of control and signaling data over the nonoptical link to the data storage, the nonoptical link comprising a copper link or a wireless radio link.

12. The method of claim 9, wherein the bidirectional data transmission takes place for an application between the first and second communication units.

13. A communication system of a motor vehicle, the communication system comprising:
   a data source configured to transmit data comprising at least video data and to receive data;
   a data sink configured to transmit said one or both of control and signaling data and to receive data transmitted by the data source;
   an optical link having a high bandwidth capacity coupled between the data source and data sink, and configured to transmit data therebetween;
   a nonoptical link having a lower bandwidth capacity than the high bandwidth capacity of the optical link, the nonoptical link being coupled between the data source and the data sink and configured to transfer one or both of control and signaling data from the data sink to the data source concurrently with the transmission of data over the optical link from the data source to the data sink;
   a transmitting optical interface coupled between the data source and the optical link, wherein the transmitting optical interface comprises:
   a serializer configured to convert high bandwidth parallel data output from the data source into a first electrical serial data stream;
   a laser configured to convert the first electrical serial data stream into an optical data stream comprising at least optical video data, the transmitting optical interface coupling the optical data stream onto the optical link;
   a receiving optical interface coupled between the optical link and the data sink and being configured to receive the optical data stream coupled onto the optical link by the transmitting optical interface, wherein the receiving optical interface comprises:
   a photodiode configured to convert the received optical data stream into a second electrical serial data stream; and
   a deserializer configured to convert the second electrical serial data stream into high bandwidth parallel data;
   a transmitting electrical interface coupled between the data sink and the nonoptical link, wherein the transmitting electrical interlace is configured to couple said one or both of control and signaling data from the data sink onto the nonoptical link; and
   a receiving electrical interface coupled between the nonoptical link and the data source and being configured to receive said one or both of control and signaling data coupled onto the nonoptical link by the transmitting electrical interface, said one or both of control and signaling data being used by the data source to control operations of the data source.

* * * * *

UNITED STATES PATENT AND TRADEMARK OFFICE
CERTIFICATE OF CORRECTION

PATENT NO.         : 7,602,739 B2
APPLICATION NO.    : 11/347620
DATED              : October 13, 2009
INVENTOR(S)        : Martin Weigert It is certified that error appears in the above-identified patent and that said Letters Patent is hereby corrected as shown below:

Title Page Col. 1 item (75), (Inventor) Line 1, delete "Hardt" and insert -- Eherzhausen --;

Column 6, Line 25, Claim 1, delete "date" and insert -- data --;

Column 6, Line 33, Claim 1, delete "unit" and insert -- unit; --;

Column 8, Line 51, Claim 13, delete "interlace" and insert -- interface --.

Signed and Sealed this
Fifth Day of March, 2013

Teresa Stanek Rea
*Acting Director of the United States Patent and Trademark Office*